United States Patent [19]
Bridwell et al.

[11] 3,863,744
[45] Feb. 4, 1975

[54] STEERING CLUTCH ACTUATING SYSTEM

[75] Inventors: John W. Bridwell, Peoria; Conard E. Leighty, Metamora; John G. Wellwood, Peoria, all of Ill.

[73] Assignee: Caterpillar Tractor Co., Peoria, Ill.

[22] Filed: Sept. 1, 1972

[21] Appl. No.: 285,925

[52] U.S. Cl............. 192/91 R, 192/13 R, 192/99 S
[51] Int. Cl............................................. F16d 25/08
[58] Field of Search...... 192/85 C, 91 R, 99 S, 13 R

[56] References Cited
UNITED STATES PATENTS

| | | | |
|---|---|---|---|
| 2,275,758 | 3/1942 | Harris | 192/85 C X |
| 3,099,340 | 7/1963 | Camp | 192/99 S |
| 3,307,662 | 3/1967 | Biabaud | 192/91 R X |
| 3,406,800 | 10/1968 | Buchanan et al. | 192/91 R |
| 3,430,744 | 3/1969 | Oguri | 192/91 R X |

*Primary Examiner*—Benjamin W. Wyche
*Attorney, Agent, or Firm*—Phillips, Moore, Weissenberger, Lempio & Strabala

[57] ABSTRACT

An actuating system for the steering clutch in a track-type vehicle which has a yoke member rockingly movable for clutch disengagement when actuated by an in-line disposed fluid motor. The fluid motor is connected to the yoke member by means of a single rod link having self-aligning spherical joints and is directly removably mounted upon an easily accessible portion of the vehicle to permit facileservicing. A bleed valve which directly communicates with the fluid motor pressure chamber through a port, which port may also be utilized for connection of a pressure gauge is disposed directly accessibly from the exterior of the vehicle.

3 Claims, 4 Drawing Figures

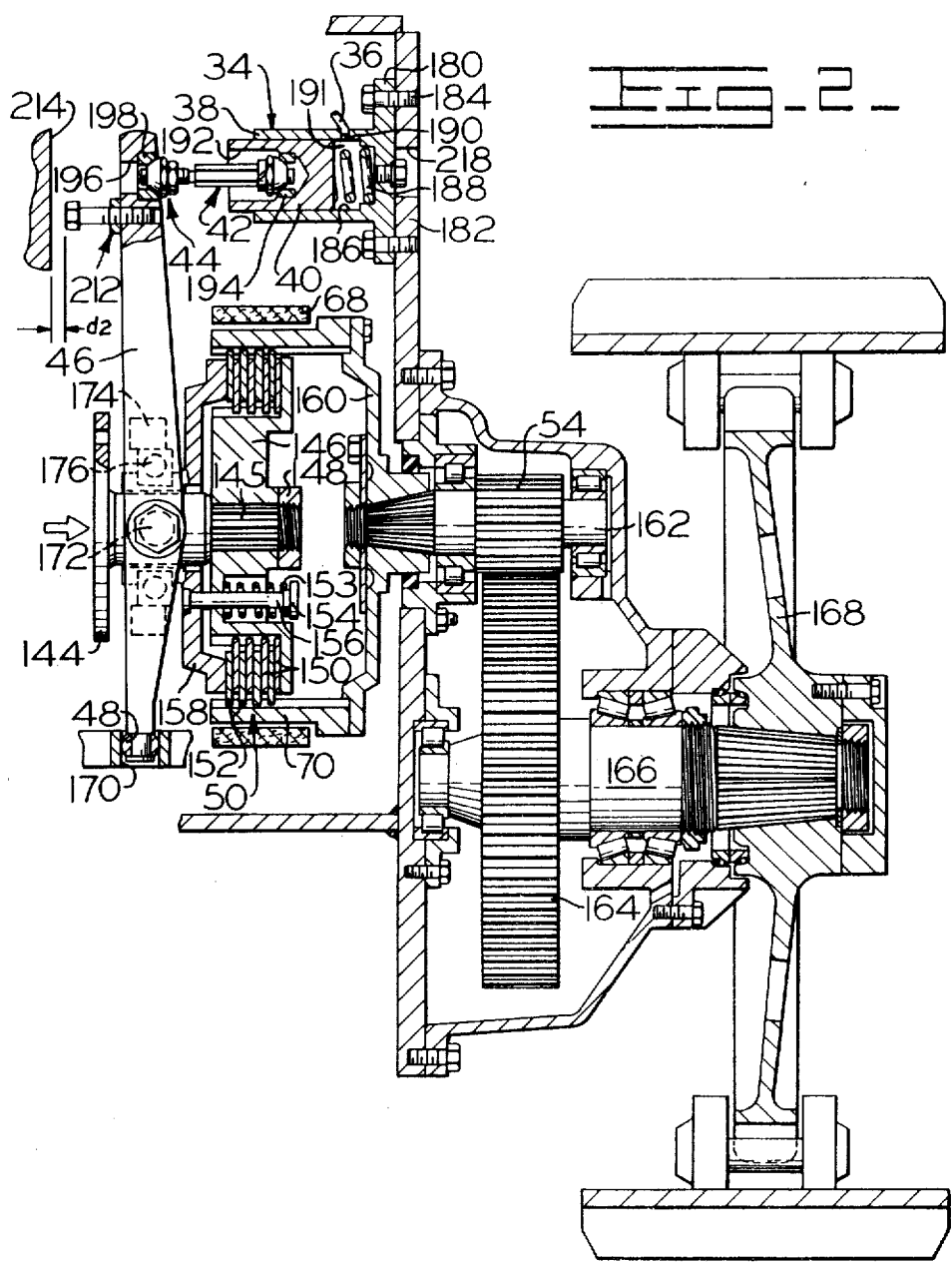
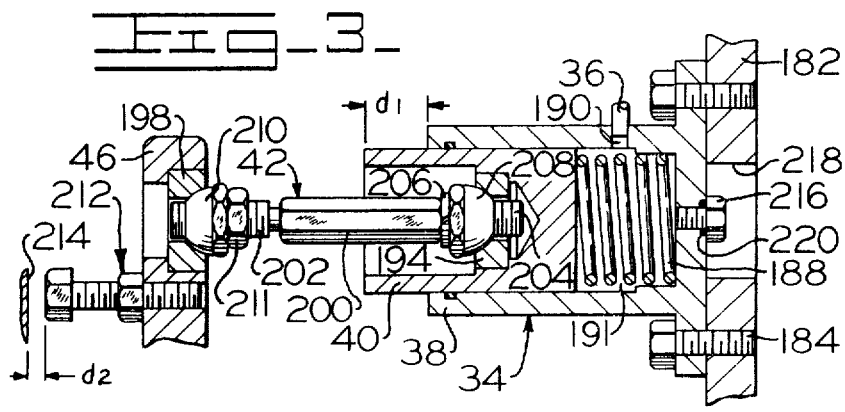
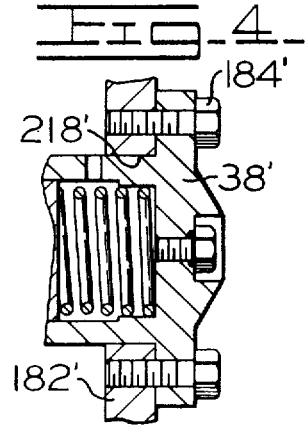

STEERING CLUTCH ACTUATING SYSTEM

BACKGROUND OF THE INVENTION

Steering of track-type vehicles has traditionally been accomplished by varying the relative speeds of the respective tracks. Such speed variance may be accomplished in several ways as set forth in copending Pat. application Ser. No. 285,926 entitled STEERING CLUTCH AND BRAKE CONTROL SYSTEM filed by John W. Bridwell and Robert Casey, on Sept. 1, 1972, of common assignment herewith.

In the noted copending application a steering system is described wherein separate, manually operated controls for each of the tracks are provided and each control sequentially releases or disengages a steering clutch on one side of the vehicle and then applies a steering brake on the same side. A foot-pedal activated actuating system is described in which one can provide for such sequential disengagement of the steering clutches.

The present application is directed to the particular actuating system which responds to the aforementioned footpedal system, its mounting upon the vehicle and its construction.

Clutch actuating means in the prior art ahve included hydro-mechanical systems such as that disclosed by U. S. Pat. No. 3,448,841 to Sidles, Jr., of common assignment herewith. The steering clutch control system described by such patent has previously proved quite effective for use in so called "wet" steering clutch and brake housings. In the patented system the fluid actuating motor includes an extendible hydraulic piston disposed in-line with a clutch yoke member and employs a roller system for actuating the yoke member in response to piston movement. However, because the Sidles system is adapted for use in a wet clutch housing, the radial bores 53' therein can exhaust hydraulic fluid for cooling and relief purposes during use and this is totally unsatisfactory for use in dry clutch and brake systems.

Removal of the fluid-exhausting stroke-limiting feature in the Sidles device would completely change the operation of that system and would require extensive redesign to develop a comparable in-line system which would provide maximum response, minimum adjustment linkage, and a facile accessibility for servicing, such as during air-bleeding operations or the like.

SUMMARY AND OBJECTS OF THE INVENTION

The present invention provides a simple and economically fabricated clutch actuating system which is directly connected to an externally accessible part of the track-type vehicle, which provides direct, in-line actuation of the clutch yoke member, which is useable in dry clutch and brake systems, and which is readily serviceable during use.

An object of the present invention is to provide a steering clutch actuating system which provides a dry-type actuating fluid motor connected by means of a single link to the yoke member wherein the single link is a rod having nutating spherical joints on either end thereof which accommodate slight angular movement of the rod during operation.

Another object of this invention is to provide a fluid actuating motor readily accessible from externally of the vehicle for facile servicing.

Still another object of the invention is to provide a fluid motor having a bleed valve externally accessible.

A further object of the invention is to provide a readily removably mounted steering clutch actuating motor.

Other objects and advantages of the present invention will become apparent upon reference to the accompanying drawings and the following description.

BRIEF DESCRIPTION OF THE DRAWINGS

FIG. 2 is a developed sectional view of the steering clutch actuating system showing the clutch and actuator operatively connected to the final drive gearing of the tractor;

FIG. 3 is an enlarged view of the clutch actuator system shown in FIG. 2; and

FIG. 4 shows an alternate arrangement for mounting the actuator motor upon the vehicle.

DETAILED DESCRIPTION

Figure 1:
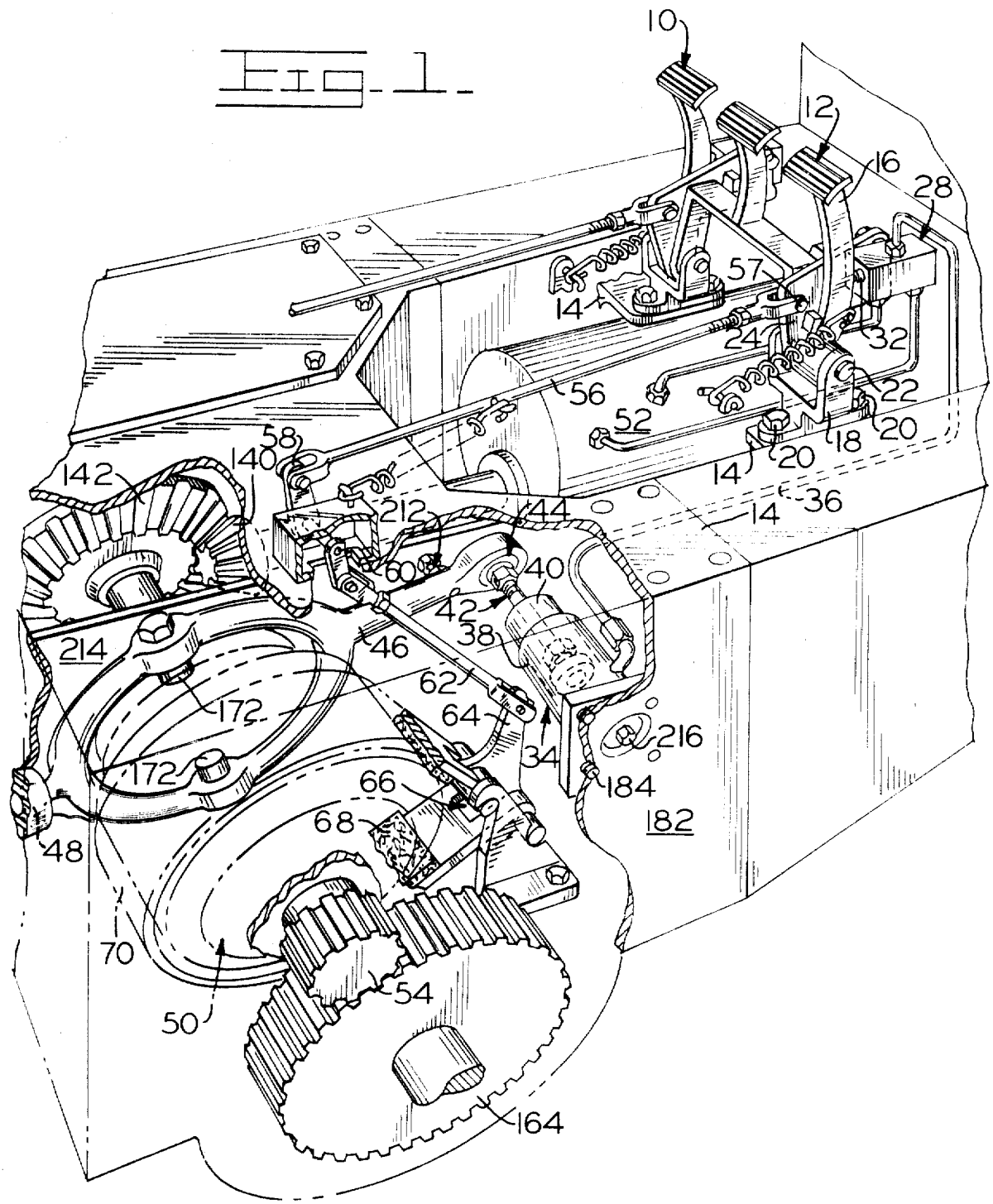
FIG. 1 is a partially cut-away isometric view of the instant steering clutch actuating system in a track-type vehicle having two tracks.

With reference to FIG. 1 of the drawings, left and right-hand, pedal-activated steering clutch and brake control systems are shown generally respectively at 10 and 12. Such pedal control systems are shown pivotally connected to the main frame 14 of the track-type vehicle at 22.

The right-hand pedal control system 12, taken as exemplary, comprises a foot pedal 16 which is pivotally mounted upon a yoke member 18 which is in turn removably secured to the main frame 14 by way of a plurality of bolts 20. The yoke member 18 contains a transversely and horizontally disposed pivot pin 22 upon which the foot pedal 16 is mounted. A floating, upright lever member 24 is also mounted upon the pivot pin 22 between the furcations of the yoke member 18 and inwardly of the foot pedal 16. The lever member 24 fixedly supports a hydraulic fluid control valve, shown generally at 28, on a forward portion thereof.

Disengagement of a steering clutch is provided by a remotely disposed fluid motor 34 which is supplied with hydraulic fluid under pressure through a conduit 36 leading from the valve 28. The fluid motor 34 has a cylinder 38 which is removably secured to the main frame 14 by a plurality of bolts 184 and which has a piston 40 which is disposed therein and is inwardly extendible towards a yoke member 46 with increasing pressure in the conduit 36. Such movement of the piston 40 causes a rod or link 42 to act against a ball joint which is shown generally at 44 to cause rocking movement of the upright yoke member 46 around a ball joint 48 which is associated with and fixed to the main frame 14. Inward movement of the forward portion of the yoke member 46, as shown in FIG. 1, causes the steering clutch, shown generally at 50, to be disengaged and to discontinue power transmission from gearing 52 to the output gear 54 leading to the final drive of the vehicle, shown more particularly in FIG. 2.

When the foot pedal 16 is depressed, it acts through the plunger 32 to condition the fluid control valve 28 to supply fluid pressure through the conduit 36. The control valve 28, in addition to sending pressure to the fluid motor 34 for clutch actuation, also controls the steering brake. The housing of the control valve 28 is interconnected with and moves the lever member 24 in a clockwise direction about the pivot pin 22. This movement causes the brake link 56, which is connected to the lever member at a pivot point 57, to be urged rightwardly as shown in FIG. 1. Such movement of the brake link 56 causes a clockwise rotation of a bell crank 58 which is oscillatingly mounted with respect to the main frame 14 by means of a pivot pin 60. Such oscillation of the bell crank 58 causes upward movement of the brake rod 62 with consequent counterclockwise movement of the actuating lever 64 to cause a toggle linkage system, shown generally at 66, to engage a brake band 68 on a drum 70 which drum is integrally secured to the output gear 54. The brake band and drum areas, shown in phantom in FIG. 1, may be of conventional construction.

With reference to FIGS. 1 and 2 in the drawings, it will be seen that power flow to each of the final drives is by way of the transmission gearing 52, pinion gear 140, bevel gear 142, steering clutch shaft 144, and clutch 50. Steering clutch shaft 144 has a splined outer end portion 145 upon which is mounted a driving drum 146 retained upon the shaft by means of a suitable fastener, such as the nut 148. A plurality of driving clutch discs 150 are disposed within the clutch housing and are engaged by the driving drum and interleafed by a plurality of driven clutch discs 152 which have external tooth portions engaging the driven drum 70.

The clutch discs 150 and 152 are normally held in engagement to permit drive therethrough by means of a plurality of springs 153 which act upon the driving drum 146 and a retainer and lock system 154 to urge a corresponding plurality of studs 156 and a plate assembly 158 outwardly towards the right, as shown in FIG. 2. Power is transmitted from the driven drum 70 through splines on the flange 160, to a final drive pinion shaft 162 upon which is formed the pinion 54. A relatively large output gear 164 is driven by the pinion 54 and is removably secured to an output shaft 166 upon which a conventional track driving sprocket 168 is fixedly mounted by means of splines.

The clutch 50 is disengaged as a result of the counterclockwise rotation of the yoke member 46, as shown in FIG. 2, about a ball joint 48 which is disposed within a suitable fixed housing bore 170. A pair of trunnions 172, best seen in FIG. 1, are removably secured to the yoke member and bias a cage member 174, shown in FIG. 2, an antifriction bearing 176 and the plate assembly 158 towards the left so that the springs 153 are compressed and the clutch 50 is disengaged. The brake band 68 may be sequentially applied after the clutch is disengaged, as discussed hereinabove to provide a more abrupt turn to the right, if such is desired.

The fluid motor 34, in more detail, particularly consists of the cylindrical housing 38 and an integrally formed outer mounted flange 180 which is removably secured to an outer side wall 182 of the vehicle main frame 14 by means of a plurality of threaded retaining bolts 184. The cylindrical housing includes a stepped conter bore 186 which is adapted to receive the extendible piston 40 and a relatively light spring 188. The chamber 191 formed by the counter bore 186 is provided with an inlet port 190 which enables fluid communication from the conduit 36 to the chamber.

The piston 40 has a stepped counter bore 192 which is adapted to receive a spherically formed socketed insert 194 at the proximal end of the rod 42, and the forward actuating extremity of the release yoke member 46 has a stepped bore 196 which is adapted to receive a similar insert 198 at the distal end of the rod 42. With reference to FIG. 3, it will be seen that the rod 42 has a central hexagonally shaped portion 200 and left and right threaded end portions 202 and 204 disposed between the aforementioned spherically socketed inserts. The right-hand, proximal end of the rod 40 includes a lock washer 206 and a spherical nut 208 threadedly mounted thereupon in facing engagement with the insert 194. The left-hand, distal end includes a similar spherical nut 210 and a jam nut 211 which is threaded thereupon so that the ends of the rod are essentially provided with self-aligning nutating joints.

The engaged disposition of the release yoke member 46 is generally determined by the disposition of the components of the clutch 50. The rod 42 is readily adjustable to a predetermined extension distance of the piston 40 from the end of the cylindrical housing 38, as designated by the distance $d_1$. Extension of the piston 40 in the leftward direction by a distance approximately equal to that shown at $d_2$ in the drawings is sufficient to disengage the clutch. Extension in this direction is limited by a stop bolt shown generally at 212. The stop bolt is also adjustable in a convenient manner to prevent unnecessary piston travel such that the end thereof is disposed essentially a similar distance $d_2$ away from the inwardly disposed, upright housing wall surface 214. It may readily be appreciated that this arrangement allows facile adjustment of piston travel and minimizes a delay generally associated with such adjustment in filling the actuating chamber 191 with fluid via the conduit 36.

When it is necessary to service the track-type vehicle, due to routine maintenance or prolonged periods of inactivity, it is possible for air to become trapped within the conduit 36 or within the actuating chamber 191. To remedy this condition an easily accessible bleed valve 216, of conventional construction, is threadedly disposed within the end wall of the cylindrical housing 38.

In the preferred embodiment shown in FIGS. 2 and 3, the head portion of the bleed valve is protectively surrounded by an opening 218 in the side wall 182 which opening allows convenient access from without the vehicle. The bleed valve may be provided with a suitable seal 220 so that the partial unthreading thereof will allow air to escape as the foot pedal 16 is manually displaced sufficiently to actuate the control valve 28 to direct fluid to the chamber 191. For servicing and operational checks, the bleed valve 216 may be unthreaded and replaced by a pressure gauge (not shown) so that appropriate pressure readings may be taken during trouble shooting of the system.

In the preferred embodiment shown in FIGS. 2 and 3, the cylindrical motor housing 38 is shown mounted on the inside of the vehicle side wall in a relatively protected location. It should be appreciated, however, that an externally mounted cylindrical housing 38', as shown in FIG. 4, could be used in those cases where full external servicing of the system is desired. Removal of a plurality of externally exposed bolts 184' would completely free the cylindrical housing of the fluid motor for removal and inspection thereof through the enlarged opening 218' in the side wall 182'.

In view of the foregoing, it should be readily apparent that the subject steering clutch actuating system has few moving parts, is highly serviceable and is effective an in-line actuator for the clutch release yoke member.

The self-aligning joints at either end of the actuating rod prevent any possible cocking of the piston as the yoke member end travels in a slightly arcuate path during actuation.

While the invention has been described and shown with particular reference to the preferred embodiments, it should be apparent that variations are possible which would fall within the spirit of the present invention, which invention is not intended to be limited, except by the scope of the appended claims.

We claim:

1. In a track-type vehicle having a steering clutch for selectively discontinuing power transmission to a track of said vehicle; yoke means associatd with said clutch for disengaging said clutch when disposed in a first predetermined position and for engaging said clutch when disposed in a second predetermined position, actuator means connected to an externally accessible portion of said vehicle for moving said yoke means toward said first predetermined position, single rod means connected between said yoke means and said actuator means for transmitting actuator forces to said yoke means for movement thereof, said single rod means being connected between said actuator means and said yoke means by means of spherical joints movably mounted within sockets in said actuator means and in said yoke means, said actuator means including a fluid motor having a piston which receives a portion of said single rod means therein, said piston being mounted within a fluid-tight cylinder having a pressure chamber therein directly communicating with a portion of said piston and wherein a fluid bleed port is provided in said cylinder which communicates said pressure chamber with the exterior of said cylinder, said bleed port being accessible from the exterior of said vehicle, said actuator means including a flange member which is directly connected to said externally accessible portion of said vehicle by means of readily removable fastening means and wherein upon removal of said fastening means from said flange member said actuator means may be removed from said vehicle, said externally accessible portion of said vehicle including an access opening having a dimension greater than that of a portion of said fluid-tight cylinder, said flange member being attached to said fluid-tight cylinder externally of said access opening while said portion of said fluid-tight cylinder is disposed within said access opening, said fluid-tight cylinder being removable through said access opening upon removal of said fastening means.

2. The invention of claim 1 wherein adjustable stop means are provided on said yoke means to limit movement of said yoke means toward said first predetermined position.

3. The invention of claim 1 wherein said single rod means include threaded adjustment means for selectively adjusting the effective length of said rod means and the distance between said yoke means and said actuator means.

* * * * *